US006650737B2

(12) United States Patent
Finnigan

(10) Patent No.: US 6,650,737 B2
(45) Date of Patent: Nov. 18, 2003

(54) TELEPHONIC VOICE MESSAGE STORE AND FORWARD METHOD HAVING NETWORK ADDRESS AND VOICE AUTHENTICATION

(75) Inventor: Paul F. Finnigan, Saratoga, CA (US)

(73) Assignee: Worldvoice, Inc., Arlington, VA (US)

( * ) Notice: Subject to any disclaimer, the term of this patent is extended or adjusted under 35 U.S.C. 154(b) by 318 days.

(21) Appl. No.: 09/772,440

(22) Filed: Jan. 29, 2001

(65) Prior Publication Data

US 2001/0008554 A1 Jul. 19, 2001

Related U.S. Application Data

(62) Division of application No. 08/977,925, filed on Nov. 24, 1997, now Pat. No. 6,181,780, which is a continuation of application No. 08/660,080, filed on Jun. 3, 1996, now abandoned.

(51) Int. Cl.$^7$ ................................................ H04M 1/64
(52) U.S. Cl. ................ 379/88.02; 379/67.1; 379/88.04; 379/88.17; 379/88.18; 379/88.19; 379/88.22
(58) Field of Search ................ 379/67.1, 71, 80, 379/88.01, 88.02, 88.04, 88.12, 88.16, 88.17, 88.18, 88.19, 88.22

(56) References Cited

U.S. PATENT DOCUMENTS

| | | | |
|---|---|---|---|
| 4,646,346 A | 2/1987 | Emerson et al. | 379/214 |
| 4,757,525 A | 7/1988 | Matthews et al. | 379/89 |
| 4,790,003 A | 12/1988 | Kepley et al. | 379/88 |
| 4,935,954 A | 6/1990 | Thompson et al. | 379/89 |
| 5,014,300 A | 5/1991 | Harvath et al. | 379/100 |
| 5,029,199 A | 7/1991 | Jones et al. | 379/89 |
| 5,029,200 A | 7/1991 | Haas et al. | 379/89 |
| 5,247,497 A | 9/1993 | Cohn | 369/26 |
| 5,291,302 A | 3/1994 | Gordon et al. | 358/400 |
| 5,384,831 A | 1/1995 | Creswell et al. | 379/67 |
| 5,509,061 A | 4/1996 | Amereller et al. | 379/207 |
| 5,572,578 A | 11/1996 | Lin et al. | 379/88.18 |
| 5,623,538 A | 4/1997 | Petty | 379/67 |
| 5,684,862 A | 11/1997 | Finnigan | 379/88 |
| 5,717,743 A | 2/1998 | McMahan et al. | 379/188 |
| 5,719,921 A | 2/1998 | Vysotsky et al. | 379/88 |
| 5,774,525 A | 6/1998 | Kanevsky et al. | 379/88 |
| 5,926,524 A | 7/1999 | Taylor | 379/88.08 |
| 5,937,047 A | 8/1999 | Stabler | 379/201 |

*Primary Examiner*—Allan Hoosain
(74) *Attorney, Agent, or Firm*—McKenna Long & Aldridge LLP

(57) ABSTRACT

Authentication of voice message recipient network addresses employs generating (102) and storing (104) a "network file" that includes "voice clips" and associated network addresses that are extracted from voice messages received across a network (10) from voice message systems (16, 18). A voice clip is the first one to three seconds of voice extracted from each received voice message. Over time, the network file will grow to contain multiple voice clips and associated network voice message addresses. When a voice message originator subsequently enters a recipient's network address (106), the originating voice message system searches (114) the network file for the network address, retrieves the associated voice clip (116), and plays it for the voice message originator to authenticate the recipient's network address. Voice authentication of a voice message originator entails encoding (134) into a "voice print file," original voice clips and associated network addresses received from positively identified voice message originators. Thereafter, when a questionable voice message is received (138), the voice message system extracts a new voice clip (142), generates a new voice print (144), and compares it with the original voice print associated with the voice message address (148). If the voice prints are substantially the same, the received voice message is annotated with a "authenticating" message (150).

7 Claims, 5 Drawing Sheets

TELEPHONIC VOICE MESSAGE STORE AND FORWARD METHOD HAVING NETWORK ADDRESS AND VOICE AUTHENTICATION

RELATED APPLICATIONS

This application is a division of application Ser. No. 08/977,928, filed Nov. 24, 1997, now U.S. Pat. No. 6,181,780, which is a continuation of application Ser. No. 08/660,080, filed Jun. 3, 1996, abandoned.

TECHNICAL FIELD

This invention relates to telephonic voice message systems, sometimes referred to as voice mail systems, and, in particular, to methods of controlling and authenticating transmission of telephonic voice message data in interconnected networks of such systems.

BACKGROUND OF THE INVENTION

Electronic communication may be conducted employing a variety of formats including direct telephonic voice communication, facsimile document communication, electronic mail communication, and telephonic voice message communication. Facsimile document communication and electronic mail communication may be characterized as document-based and the other two formats as voice-based.

Direct telephonic voice communication is unique among these formats in that it requires simultaneous participation by all parties. In many business situations, the requirement for simultaneous participation is unnecessary, disruptive, time-consuming, and often impossible because a called party telephone is busy or the party is otherwise unavailable. As a consequence, nonsimultaneous communication formats, such as facsimile document communication, electronic mail communication, and telephonic voice message communication are becoming preferred over direct telephonic voice communication for many situations.

Because ever-increasing volumes of information are being transmitted by the different nonsimultaneous communication formats, document store and forward systems have been developed to improve the efficiency, cost-effectiveness, and useability of facsimile document and electronic mail communications formats. Document store and forward systems implement features such as delivering a single communication to multiple parties, deferring communication delivery to a reduced rate time period, deferring a communication delivery until business hours in a different country or time zone, forwarding a communication to a predetermined address, returning a communication delivery notification, identifying and/or authenticating a particular communication, and delivering a particular communication according to a delivery priority.

Document-based store and forward systems, such as one described in U.S. Pat. No. 5,014,300 for METHOD AND APPARATUS FOR ACCESSING A FACSIMILE STORE AND FORWARD NETWORK, have been developed for compatibility because facsimile machines and electronic mail systems are based on digital communication technology that is intended for transmitting messages among widely separated locations, often across international boundaries. The communication receiving facsimile machines and computers are manufactured by a variety of manufacturers according to internationally accepted features, standards, and communication protocols that were developed to satisfy a common need.

In contrast, voice-based store and forward systems have not necessarily been developed for compatibility because prior voice mail systems were primarily intended for transmitting analog messages among users sharing a common voice message system, such as one installed in a corporation. Therefore, voice mail systems have been manufactured by a variety of manufacturers, each adopting a proprietary set of features and communication protocols that were developed to satisfy the needs of each manufacturer.

Clearly, voice-based store and forward systems would benefit from many of the features and capabilities of document-based store and forward systems. However, the incompatible protocols employed by different voice message systems hinder the development of all such capabilities. Moreover, because of the distances and complexities of telecommunications networks, voice messages transmitted in such networks are subject to transmission delays and costs that render impractical features such as voice signature authentication of a destination voice message address.

For example, virtually all voice message systems return to an originator a recipient's voice signature to prevent inadvertently sending a voice message to an incorrect recipient. The voice signature is typically the recorded name of the recipient user spoken in the user's voice, for example, "John Smith." In prior non-networked voice message systems, the name, voice signature, and other information associated with every user is recorded in a "user file." When an originator enters a recipient voice message address, the voice message system accesses the user file and returns the associated voice signature to the voice message originator to authenticate the entered voice message address.

Unfortunately, in a networked voice message system, when an originator enters a recipient voice message address that is at a remote destination, the originating voice message system cannot readily access the destination user file without encountering undue telecommunications-related delay and expense. The destination user file is rendered completely inaccessible if the voice message is marked for deferred delivery or for grouped transmission with other voice messages. Moreover, local duplication, updating, and storage of the myriad of destination user voice signatures is impractical. For example, the Octel VMX-5000 networked voice message system stores duplicate user files in each system and updates all of them in response to user changes. Such duplication requires a heavy and ongoing database maintenance commitment. To circumvent the database maintenance problem, the AT&T Intuity voice message system employs a centralized user file database facility. However, this approach requires time consuming network wide intercommunications, which unacceptably delays returned voice signatures.

What is needed, therefore, is a communication method suitable for intercommunicating among and rendering compatible the features and authentication methods of multiple disparate voice-based message systems and voice message store and forward units distributed across a geographically distributed telecommunications network.

SUMMARY OF THE INVENTION

An object of this invention is to provide a method by which message originators can authenticate the destination addresses of telephonic voice messages transmitted through a complex telecommunications network.

Another object of this invention is to provide a method by which a destination voice message system can authenticate the originator of a questionable voice message.

A voice message store and forward service includes a geographically distributed network of voice message store and forward units ("VMSFUs") that intercommunicate by employing a protocol A that transfers voice messages between VMSFUs with user information transfer units that include the voice message and a message envelope containing enhanced feature information, and service information transfer units that include notifications of successful and/or unsuccessful transfer of a user message. An originating VMSFU accepts a voice message from a voice message system, delivers the voice message to a destination VMSFU, and/or returns a delivered or not delivered notification to the voice message system. The destination VMSFU delivers the voice message to a voice message system identified by a destination voice message address indicated in a voice message header. Protocol A conveys enhanced features, such as conveying any unique features of disparate voice message systems, converting between message formats or voice encoding algorithms, translating addresses, mapping message recipient addresses, and accommodating message priorities. VMSFUs attach to each voice message a globally unique message identification number for tracing message progress, reporting on message delivery status, and providing accounting information. The store and forward service provides services, such as delivering voice messages at a specified time, redirecting voice messages to alternate VMSFUs, deferring delivery of specified voice messages, delivering voice messages in accordance with specified priority and delivery commitments, and minimizing message delivery costs with a scheduler.

In an embodiment of this invention, authentication of a network recipient voice message address employs generating and locally storing at an originating voice message system a "network file" that includes "voice clips" and associated voice message addresses that are extracted from voice messages received across the network from other voice message systems. A voice clip is extracted from the first one to three seconds of the received voice message, and typically contains a greeting identifying both the recipient and the originator, for example, "Hello John this is Marsha." Over time, the network file will grow to contain many voice clips and associated network voice message addresses, which are substituted for a network recipient's remotely stored voice signature.

For example, when a voice message originator, such as John, enters Marsha's network voice message address, the originating voice message system searches the network file for the Marsha's voice message address, retrieves Marshals associated voice clip, "Hello John this is Marsha," and substitutes it for the inaccessible voice signature. If Marsha's voice message address is not found (this will always be the case until a first voice message is received from Marsha), the originating system responds with the entered voice message address and indicates that an associated voice clip is not found in the network file. To prevent the network file from growing excessively large, thereby causing excessive processing time and storage costs, the voice message system periodically purges the network file of all but active and recently received voice clips.

In another embodiment of this invention, voice authentication of a voice message originator entails encoding selected voice clips and their associated network voice message addresses into a "voice print file." When a voice message is subsequently received from a voice message originator, the voice message system extracts a new voice clip, generates a new voice print, and compares it with the originally stored voice print associated with the voice message address. If the voice prints are substantially the same, the received voice message is annotated with a "authentication" message indicating that the voice message was recorded by a positively identified originator. However, if the voice prints are substantially different, the received voice message is annotated with a "warning" message indicating that the voice message may have been recorded by an imposter.

Additional objects and advantages of this invention will be apparent from the following detailed description of a preferred embodiment thereof, which proceeds with reference to the accompanying drawings.

DETAILED DESCRIPTION OF PREFERRED EMBODIMENT

Figure 1:
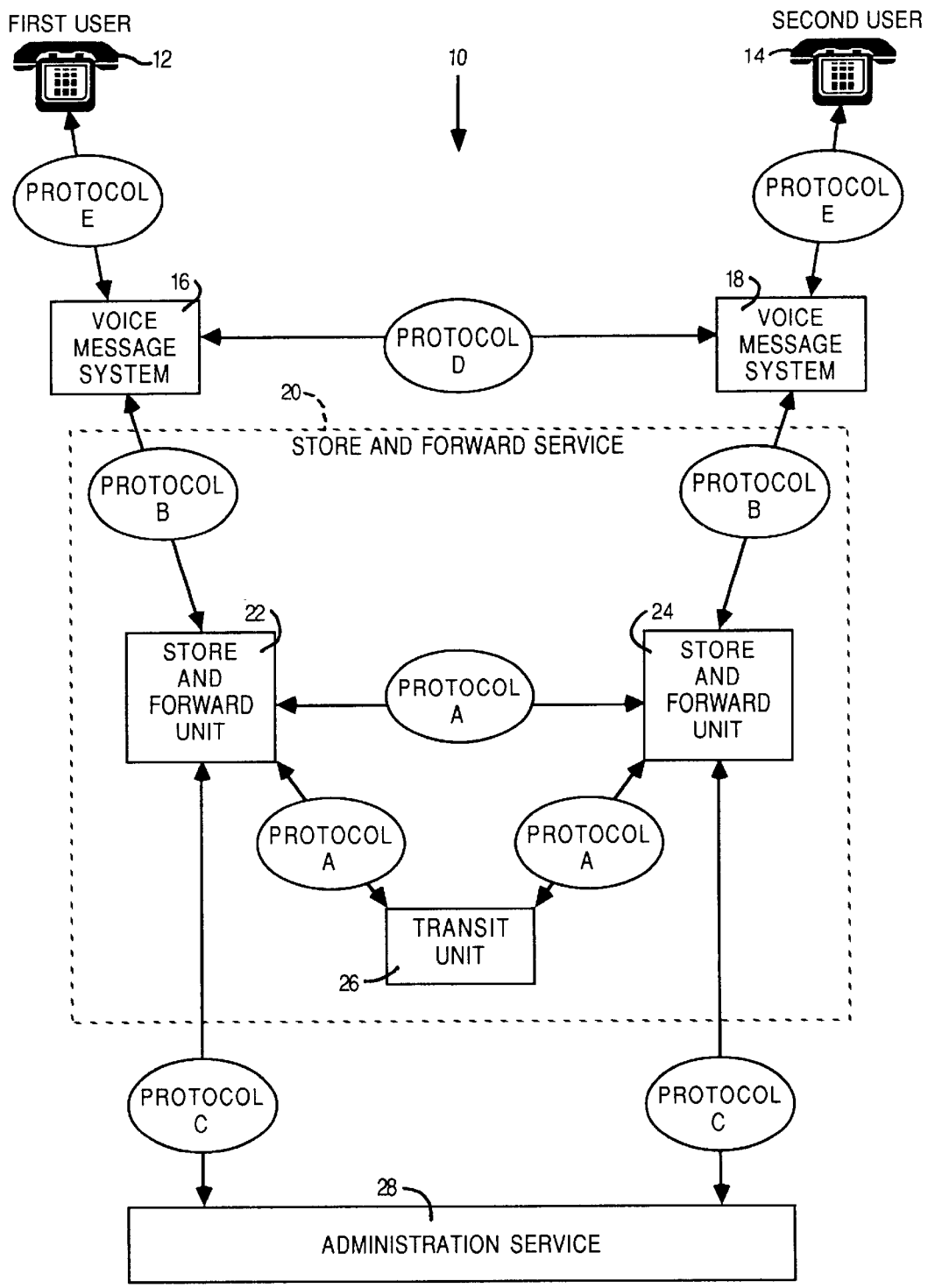
FIG. 1 is a simplified block diagram of a network of telephones, voice message systems, a store and forward service, and an administration service showing various communication interconnections and their associated protocols.

FIG. 1 shows a telecommunications network 10 including telephones 12 and 14 connected to respective voice message systems 16 and 18. Human users (not shown) employ telephones 12 and 14 to store and receive voice messages in voice message systems 16 or 18. Of course, each of voice message systems 16 and 18 may include multiple telephones 12 and 14.

Telephones 12 and 14 employ a conventional protocol E to communicate with respective voice message systems 16 and 18. Protocol E includes voice message information and dual-tone modulation frequency ("DTMF") command information that a user employs to control a particular voice message system. Protocol E typically varies from manufacturer to manufacturer of voice message systems.

FIG. 1 represents a generally conventional networked telephonic voice message system 10 that controls transmission, delivery, and storage of voice messages, which are commonly referred to as Voice Mail messages. Telephonic voice message system 10 may include voice message systems 16 and 18 of types manufactured and sold by any of a large number of manufacturers that include VMI, Comverse, Centigram, Rolm, Northern, or Boston Technology. Exemplary models of voice message systems 16 and 18 may include the INFINITY 2 manufactured by Comverse Technology Inc. of Woodbury, N.Y. and the ONE-VIEW manufactured by Centigram Communications of San Jose, Calif.

A store and forward service 20, also referred to as a gateway, includes voice message store and forward units ("VMSFU") 22 and 24 and typically a transit unit 26, which is an intermediate communications node that accepts voice messages from one VMSFU and routes them to another VMSFU or to another transit unit. It is common for VMSFUs 22 and 24 to be located on opposite sides of an geographical boundary, such as a city, county, state, or international boundary. VMSFUs 22 and 24 may be, for example, an APOGEE WORLDGATE manufactured by the assignee of this application.

For direct intercommunication, voice message systems 16 and 18 may employ a protocol D, such as the protocol described in applicant's copending U.S. patent application Ser. No. 08/332,102, filed Oct. 31, 1994 for TELEPHONIC VOICE MESSAGE TRANSMISSION CONTROL METHOD.

Voice message systems 16 and 18 employ a protocol B to communicate with respective VMSFUs 22 and 24. Protocol B is described below with reference to FIGS. 2 and 4.

VMSFUs 22 and 24 employ a protocol A to communicate with each other, with other VMSFUs (not shown), and with transit unit 26. Protocol A is described with reference to FIGS. 2 and 3.

Either of VMSFUs 22 and 24 may be an originating VMSFU that has accepted a voice message from respective voice message systems 16 and 18. By accepting the voice message, the originating VMSFU assumes responsibility for delivering the voice message and/or returning a delivered or not delivered notification to the originating voice message system.

In like manner, either of VMSFUs 22 and 24 may be a destination voice message store and forward unit that is responsible for delivering a received voice message to the voice message system identified by a destination voice message address contained in a voice message header.

VMSFUs 22 and 24 optionally communicate with an administration service 28 by employing a digital protocol C that is described with reference to FIG. 2.

Store and forward service 20 employs protocols A and B to convey voice messages between voice message systems 16 and 18. In this regard, VMSFUs 22 and 24 and transit unit 26 each have the same general responsibilities when conveying voice messages. In particular, the possibly unique feature sets of each voice message system 16 and 18 must be conveyed through telecommunications network 10 to avoid loss of any service features or quality, and store and forward service 20 should enhance service by providing, for example, a conversion service between message formats or voice encoding algorithms, address translation, and feature set conversion, such as mapping a larger number of recipients into a number of allowed subsets and accommodating message priority differences.

VMSFUs 22 and 24 attach to each voice message a globally unique message identification number useable for tracing message progress, reporting on message delivery status, and providing accounting information.

Store and forward service 20 provides additional requirements and services, such as storing voice messages for a predetermined amount of time before returning a negative acknowledgment to the originating voice message system, delivering a particular voice message to a specified voice message system at a specified time, redirecting a voice message to another VMSFU, deferring delivery of a specified voice messages and recognizing and delivering voice messages in accordance with any priority and associated delivery commitments attached to each voice message. Of course, consideration is given to the cost of message delivery. For example, store and forward service 20 may intentionally delay conveying a voice message in order to group it with other voice messages to take advantage of network utilization or minimize connection costs. Such delays take into consideration any message priority and delivery commitments.

Store and forward service 20 may also provide an authentication service that positively identifies the source and destination voice message systems. Other privacy services, such as encryption, may mask the content of the voice message, its destination address, and the addresses of any additional recipients.

Store and forward service 20 may impose additional requirements on voice message systems 16 and 18. For example, VMSFU 22 may include a "pull message" command that retrieves from voice message system 16 messages addressed to a user of voice message system 18, a message retransmission feature may be required to support recovery of voice messages interrupted during transmission, and an information response feature may be required such that voice message address status, message transfer status, system authentication, version identification, and voice signatures can be returned to a requesting resource.

Returning a voice signature requires returning to originating voice message system 16 a predetermined number of seconds of the recipient's voice. The voice signature response is normally provided from the user file located in destination voice message system 18. However, returning voice signature responses through telecommunications network 10 is often impractical because of the above-described transmission delays and network-related costs. Therefore, voice signatures may optionally be returned by a directory service provided by administration service 28 or by substituting a voice clip technique of this invention that is described with reference to FIG. 5.

Figure 2:
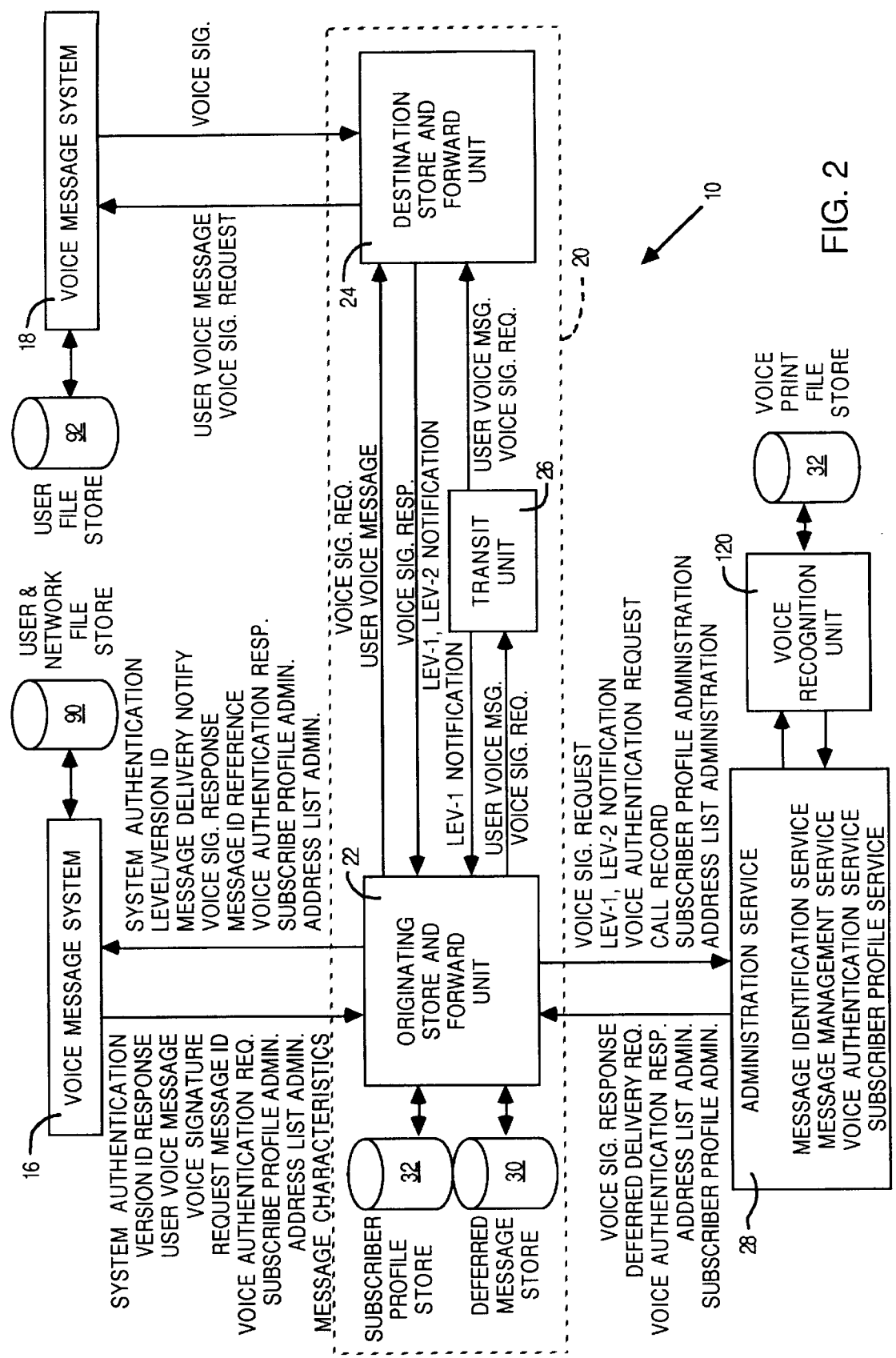
FIG. 2 is a simplified block diagram of a pair of voice message systems intercommunicating among a pair of store and forward units, a transit unit, and an administration service showing a flow of various voice message and protocol information types.

FIG. 2 shows some typical information types conveyed by protocols A, B, and C in telecommunications network 10 from the standpoint of originating voice message system 16 and originating VMSFU 22. Originating VMSFU 22 serves as an interface to other services provided by administration service 28, such as message identification, message management, voice signatures, voice authentication, and subscriber profile maintenance. A voice authentication technique of this invention is described with reference to FIG. 6.

The specified services place several functional requirements on originating VMSFU 22. For example, a deferred message store 30 is required for storing voice messages awaiting deferred delivery. Likewise, a subscriber profile store 32 retains user address lists, defines user preferences, and provides instructions for filtering, forwarding, and deferring voice message deliveries. The user preferences are retained on a per-subscriber basis, where a subscriber is defined as any entity having an address that can be identified by VMSFU 22, that is, a subscriber may be, for example, an individual recipient, a voice message system, or a corporate entity.

Protocol A is used to transfer user information transfer units and service information transfer units between VMSFUs 22 and 24 and transit unit 26. In general, information transfer units are multi-part messages exchanged between two units in which the receiving unit may not take action on an information transfer unit until all parts of the message have been successfully received.

A user information transfer unit is a user message including a voice message and a message envelope containing additional information.

A service information transfer unit is administrative- or service-related information such as, for example, notifications indicating successful and/or unsuccessful transfer of responsibility for a user message to either destination VMSFU 24 (level 1) or to the voice message recipient (level 2).

Protocol A is employed within a generalized voice message store and forward unit network. That is, VMSFUs 22 and 24 are part of a larger telecommunications network. For this reason, protocol A includes notification, status, and other functions that enable other VMSFUs in the network to learn about the presence of newly added VMSFUs, thereby permitting the added units to be introduced within the existing network.

Protocol A is transport and message exchange independent, meaning that protocol A may be based on well-known message exchange protocols including the International Telecommunications Union ("ITU") X.400, Audio Messaging Interchange Specification Digital ("AMIS-D") with extensions, MIME, and SMTP, with ITU X.400 being preferred.

Figure 3:
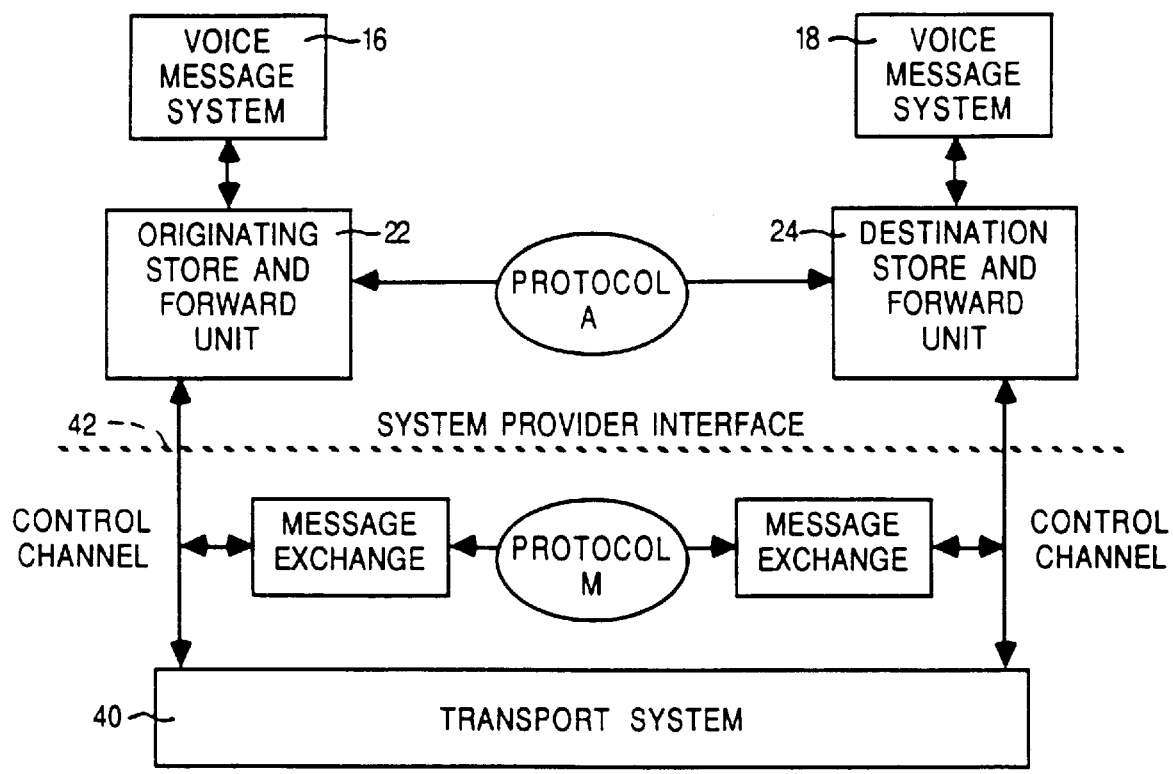
FIG. 3 is a simplified block diagram of a pair of voice message systems, a pair of store and forward systems, a system provider interface, and a control channel showing the interconnection pathways and protocols A and M employed to exchange message and control information.

FIG. 3 shows the preferred architecture for protocol A, which embeds protocol A in a digital message-based protocol M that also implements a control channel. The control channel portion of protocol M employs a transport system 40 that is a communication system for delivering non-voice data, control information, and message-related service information transfer units to a specified destination. The service information transfer units include, for example, service announcement requests and responses, security-related service information, and accounting information.

Transport system 40 may be based on the well-known internet TCP/IP or OSI protocol layers one to four. Alternatives for implementing protocol A and message protocol M include ITU X.400 protocol, AMIS-D with extensions, MIME, and SMTP, with ITU X.400 being preferred.

A service provider interface 42 provides to VMSFUs 22 and 24 functions including voice message delivery and a system management control channel.

Protocol A enables VMSFUs 22 and 24 to send and receive the following service information transfer units from another VMSFU or transit unit 26. Level 1 notification, level 2 notification (message delivery notification), voice signature request, service announcement request, accounting information (also referred to as a call record), and system authentication.

In general, in the interconnection of VMSFUs, the responsibility for delivering single- and multi-address voice messages originates at an originating VMSFU, such as MVSFU 22, and is transferred to one or more destination VMSFUs, such as VMSFU 24.

Information transfer units are preferably transferred between VMSFUs 22 and 24 by employing protocol data units defined in ITU X.400. Recipient addresses are preferably transferred between VMSFUs 22 and 24 by employing an originator/recipient address format defined in ITU F.401. Messages are preferably transferred between VMSFUs 22 and 24 by employing commercially available transit facilities that are available subject to agreement of the commercial service providers involved.

The address of a voice message is the telephonic network address specifying the intended destination of the voice message. The address is preferably an international direct distance dialing number. For a single address voice message, a single international direct distance dialing number is supported by VMSFUs 22 and 24. Likewise, for a multiple address voice message, a corresponding number of international direct distance dialing numbers are supported by VMSFUs 22 and 24. Expansion of address lists is performed at originating VMSFU 22.

Upon successfully submitting a voice message, originating VMSFU 22 assigns the globally unique identification number to the voice message. Identification numbers are used to identify voice messages in notifications conveyed between VMSFUs.

The resulting message envelope is transferred from originating VMSFU 22 to destination VMSFU 24. The preferred contents of the message envelope are listed below in Table 1.

TABLE 1

Message Envelope Contents

| Field<br>Voice Signature Field | Provided by<br>O/D (Note) |
|---|---|
| Recipient information | |
| address (number) | O |
| organization | O |
| organizational unit(s) | O |
| physical address lines | O |
| voice msg. network address | O |
| Message information | |
| Total duration in minutes | D |
| Number of sub messages | D |
| Class of service-Urgency | O |
| Class of service-Delivery | O |
| Submission date and time | O |
| Message reference | O |
| Originator Information | |
| address (number) | O |
| organization | O |
| organizational unit(s) | O |
| physical address lines | O |
| voice msg. network address | O |

Where:
O = Provided by originating VMSFU
D = Provided by destination VMSFU

Note: Provisions for a voice signature capability are arranged by a bilateral agreement. Because such agreements are often nonexistent or impractical to implement, a preferred voice clip alternative to voice signatures is described below with reference to FIG. 5.

Protocol B is employed to transfer user information transfer units and service information transfer units, such as address list administration data, message identification requests, and voice signature requests between voice message systems 16 and 18 and respective VMSFUs 22 and 24.

Figure 4:
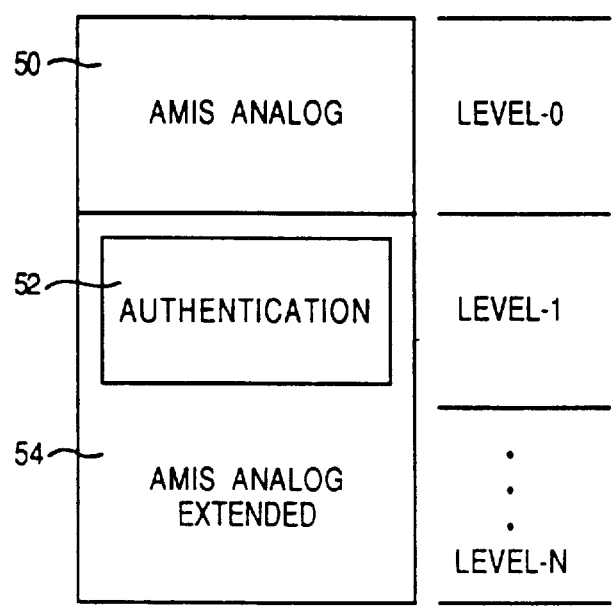
FIG. 4 is a simplified block diagram showing a protocol B architecture of this invention.

FIG. 4 represents the architecture of protocol B, which is an analog protocol based on functionality extensions to the well-known AMIS-Analog ("AMIS-A") protocol 50 (level 0). Protocol 3 extends the functionality of AMIS-A by adding authentication features 52 (level 1) and extended voice messaging services 54 (level 2 to level N) that support VMSFU functions.

Protocol B supports various levels of compliance with AMIS-A through a bidirectional level/version exchange between a VMSFU and its associated voice message system, which identifies the protocol version supported by each resource to be employed in a voice message transfer.

Protocol B requirements are grouped into architecture, voice message, and security categories with each category being related to a different class of service. When initiating a voice message, a level/version identification service information transfer unit indicates which classes of service and versions are supported by store and forward service 20 and the particular VMSFU, such as 22. It is necessary that the voice message system accept and deliver user information transfer units. The different protocol levels provide different degrees of service. For example, level 0 is basic AMIS-A 50, level 1.0 is AMIS-A 50 plus authentication features 52, and level 2.0 adds a voice signature feature and the above-described "pull message" feature. The levels are inclusive, that is, compliance with level 2.0 assumes compliance with levels 0.0 and 1.0. Furthermore, the versions of the nested levels are necessarily the same, that is, it is not possible to support level 2, version 3 (2.3) and level 1, version 0 (1.0).

Protocol B preferably implements AMIS-A protocol 50, which is stored and used as the basis for building authentication features 52 and extended feature 54 enhancements.

Regarding authentication features 52 and extended voice messaging services 54, all extended features employ a protocol extension option (function=8) of AMIS-A protocol 50. In particular, authentication features 52 provide a bilateral resource authentication between the VMSFU and the voice message system, which is a precursor to actual delivery of enhanced features. After a requesting resource has been properly authenticated, enhanced feature service information transfer units are exchanged, including requesting a voice signature of a voice message recipient; requesting status of a voice message address including number of messages waiting, message priorities, and date message posted; and pulling voice messages from a specified voice message address for delivery elsewhere.

Additional message features can be added to upgrade AMIS-A protocol 50 for compatibility with many AMIS-D features, such as providing delivery notification, message importance indication, message privacy, message priority, nonreceipt notification, receipt notification, message originator's voice signature, service notification, an increased number of messages per call, an increased number of recipients per message, and an increased message length.

In implementing protocol B, it is preferred that voice message systems 16 or 18 accept from VMSFUs 22 and 24, service information transfer units for system authentication, level/version identification, level 1 and level 2 message delivery notifications, voice signature, and message identification number.

Voice message systems 16 and 18 may optionally accept from VMSFUs 22 and 24 service information transfer units for a voice authentication response, address list administration, subscriber profile administration, and voice message address status requests.

Preferably, voice message systems 16 and 18 provide service information transfer units for system authentication and level/version identification and may optionally provide service information transfer units for voice signature (xx seconds of the message originator's voice), requesting message identification, address list administration, requesting voice authentication, subscriber profile administration, and voice message address status responses.

The preferred format for protocol B service information transfer units is:

| * | nn | 8 | FUN | MOD | DATA | CKSUM |

Where:

| | |
|---|---|
| * | Is an escape sentinel. |
| nn | Is a message length. |
| 8 | Is the AMIS-A protocol extensions function code. |
| FUN | Is a two-digit function code. |
| MOD | Is a two-digit function modifier code. |
| DATA | Is optional data dependent on the values of FUN and MOD. |
| CKSUM | Is a two-digit AMIS-A checksum. |

Preferred function, modifier, and data field values for protocol B service information transfer units are defined below in Table 2.

TABLE 2

| FUN | MOD | DATA | SERVICE INFO TRANSFER UNIT |
|---|---|---|---|
| 01 | | | SERVICE DEFINITION |
| | 01 | | Level/version identification |
| | | MMNN | Version: MM major, NN minor. For example, 0203 is level 02, version 03. |
| | 02 | | System authentication unit |
| | | AAAAA | Authentication data |
| 02 | | | ADDRESS LIST ADMINISTRATION |
| 03 | | | SUBSCRIBER PROFILE ADMINISTRATION |
| 04 | | | MESSAGE SERVICE RELATED |
| | 01 | | Voice Authentication Request |
| | | NN | Length in seconds (Originator's voice name) |
| | 02 | | Voice authentication response |
| | | (CC . . .) | Certificate |
| | 03 | (ID . . .) | Message identification response Data is the global identification for this message |
| 05 | | | DELIVERY NOTIFICATION |
| | 01 | | Level 1 notification |
| | 02 | | Level 2 notification |
| | 03 | | Receipt notification |
| | 04 | | Delivery notification |
| | 05 | | Message failure report |
| | 06 | | Message delivery report |
| 06 | 01 | | MESSAGE CHARACTERISTICS |
| | | Characteristics Field | Octets describing the message characteristics (see below) |
| 07 | | | MESSAGE MODIFICATION |
| | 01 | | Data = GMT time for delivery |
| | | SSGMT | SS = Scope<br>01 = This message only<br>02 = All messages in this communication<br>GMT = time for delivery |
| 08 | | | ADDRESS RELATED |
| | 01 | | Address status request |
| | | MMM MMM | Address number |
| | 02 | SSS . . SSS | Address status response |
| 09 | | | RECOVERY |
| | 01 | | Request resumption for message |
| | | (ID #) | Message ID for recovery process |
| | | (State) | Last valid State of protocol exchange (# delimited) |

The preferred format of the message characteristics data field is:

| BBBBPOOOLLVVVSSS...SSS#RR...RR#RRRR... |

Where:

| | |
|---|---|
| BBBB | bit significant field concatenation of the following:<br>1 = Delivery notification request<br>2 = Forward (redirect indication)<br>4 = Nonreceipt notification requested<br>8 = Message privacy requested<br>16 = Message indentification requested<br>32 = Voice identification requested<br>64 = Voice signature present |
| P | priority field<br>0 = no probability<br>1 = urgent<br>2 = routine<br>3 = low<br>4 = deferred |
| 000 | reserved for future use |
| LL | length of the voice signature in seconds |

-continued

```
BBBBPOOOLLVVVSSS...SSS#RR...RR#RRRR...
```

Where:

| | |
|---|---|
| VVV | number of seconds of the voice message portion |
| SSSSS# | originator address number (# delimited) |
| RRR#RRR# | receipient address number(s) (# delimited) |

Referring again to FIGS. 1 and 2, protocol C is used to transfer service information transfer units, such as address list administration data, voice authentication requests, voice signature requests, and accounting information transfer units, between VMSFUs 22 and 24 and administration service 28.

Protocol C is based on an existing digital messaging protocol, such as internet TCP/IP or OSI protocol layers one to four.

Administration service 28 preferably accepts service information transfer units for system authentication, level/version identification, call records, voice signature requests, voice authentication requests, level 1 and level 2 notifications, address list administration, subscriber profile administration, and quality of service responses.

In like manner, administration service 28 preferably provides service information transfer units for system authentication, level/version identification, voice signature responses, deferred delivery requests, voice authentication responses, address list administration, subscriber profile administration, and quality of service requests.

The preferred format of protocol C service information transfer units is the same as the format for protocol A.

Figure 5:
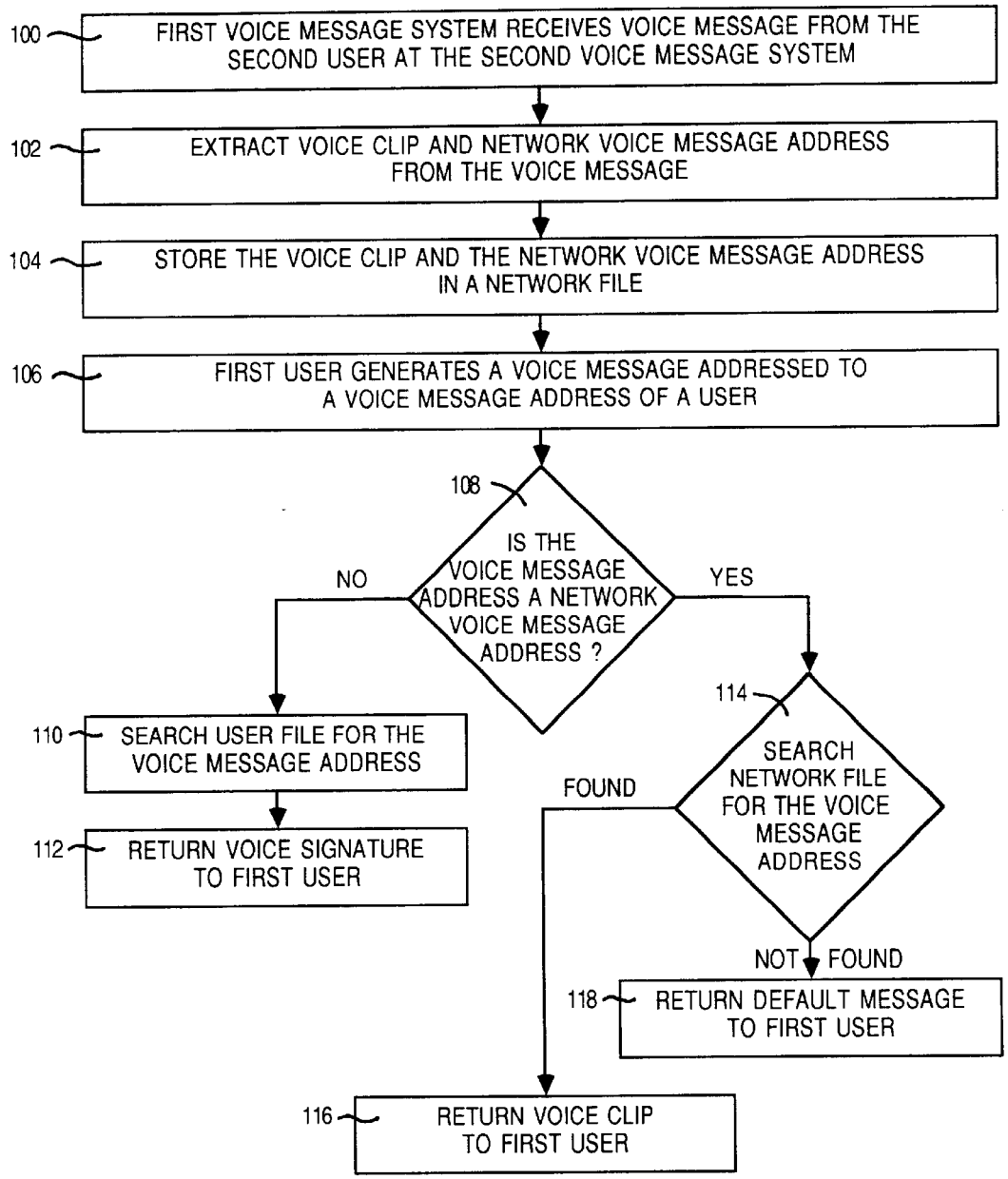
FIG. 5 is a flow diagram showing steps for authenticating a voice message destination address by employing a voice clip of this invention.

FIG. 5 shows a voice clip embodiment of this invention by which a voice message originator authenticates a voice message address of a recipient located at a remote destination in telecommunications network 10.

Referring also to FIG. 2, authentication of a network recipient voice message address, for example in voice message system 18, preferably employs voice message system 16 to generate and store a "network file" in a user and network file store 90. Of course, the roles of voice message systems 16 and 18 may be reversed, and the recipient voice message address authentication technique may be implemented in originating VMSFU 22, destination VMSFU, or administration service 28.

The network file includes voice clips and associated voice message addresses that are extracted from voice messages received across telecommunications network 10 from other voice message systems such as voice message system 18. A voice clip is preferably the first two to three seconds of a received voice message, and typically contains a greeting identifying both the recipient and the originator, for example, "Hello John this is Marsha." Over time, the network file will grow to contain many voice clips and associated network voice message addresses. Subsequently, when a voice message originator generates in voice message system 16 a voice message having a voice message address in voice message system 18, Voice message system 16 recognizes the voice message address as a network voice message address, searches the network file for a matching network voice message address, and substitutes the associated voice clip for the voice signature stored in a user file store 92 of voice message system 18. Employing the voice clip stored in user and network file store 90 avoids transmitting across telecommunications network 10 the voice signature stored in user file store 92.

In particular, voice clip authentication of a recipient voice message address proceeds according to the flow diagram of FIG. 5.

A voice message receiving block 100 represents a first voice message system receiving a voice message envelope containing a voice message addressed to a first user at the first voice message system from a second user at a second voice message system.

A voice clip extracting block 102 represents the first voice message system extracting a voice clip containing the first xx seconds (xx is one to three seconds, but preferably two to three seconds) of the voice message received from the second voice message system and extracting from the voice message envelope a network voice message address of the second user. Alternatively, if a voice signature field is included in the voice message envelope, the voice signature of the second user may be extracted instead of the voice clip. Hereafter, for clarity only the extracted voice clip will be described, although skilled workers will understand that an extracted voice signature may be substituted if available.

A network file storing block 104 represents the first voice message system storing in a network file the voice clip and its associated network voice message address of the second user.

Note that blocks 100, 102, and 104 are preferably repeated for multiple messages received from other than the first voice message system, resulting in generating a network file containing multiple corresponding voice clips and their associated network voice message addresses.

A voice message generating block 106 represents the first user at the first voice message system generating a voice message having a voice message envelope directed to a voice message address of a user.

A voice message destination decision block 108 represents the first voice message system determining whether the voice message address of the user is associated with the first voice message system or another voice message system.

If the voice message address of the user is associated with the first voice message system, a user file searching block 110 represents the first voice message system searching the user file for a storage location associated with the voice message address of the user.

A voice signature returning block 112 represents the first voice message system returning a voice signature of the user to the first user to authenticate the voice message address of the user.

If, however, the voice message address of the user is that of the second user and is associated with the second voice message system, a network file searching block 114 represents the first voice message system searching the network file for a storage location associated with the network voice message address of the second user.

If the storage location associated with the network voice message address of the second user is found, a voice clip returning block 116 represents the first voice message system returning a voice clip of the second user to the first user to authenticate the network voice message address of the second user.

If, however, the storage location associated with the network voice message address of the second user is not found, a default message returning block 118 represents the first voice message system returning a default message, such as "(entered network voice message address) not found in network file" to the first user.

To prevent the network file from growing excessively large, thereby causing excessive searching time and storage costs, the first voice message system periodically purges the network file of voice clips that have not been stored or accessed during a predetermined time period, preferably about one month. Fortunately, as in contemporaneous voice communications, a majority of voice message communications occur during a relatively short time period and among a fairly small circle of associates and friends. In practice, it has been found that over 95 percent of all voice message communications can be covered by maintaining voice clips in the network file for the most recently used 20 to 50 user names.

The voice clip technique not only avoids network communications delay time and costs, but also avoids any requirement for manually processing additions, deletions, and changes to the network file.

In telecommunication network 10, voice messages can also originate from impostors using public and private telephones (not shown). Therefore, message integrity and security is an issue, and authenticating the identity of a message originator is desirable in many situations. Heretofore, a common way of authenticating the identity of a message originator required the message recipient to call the message originator and inquire whether he or she sent the voice message in question.

Figure 6:
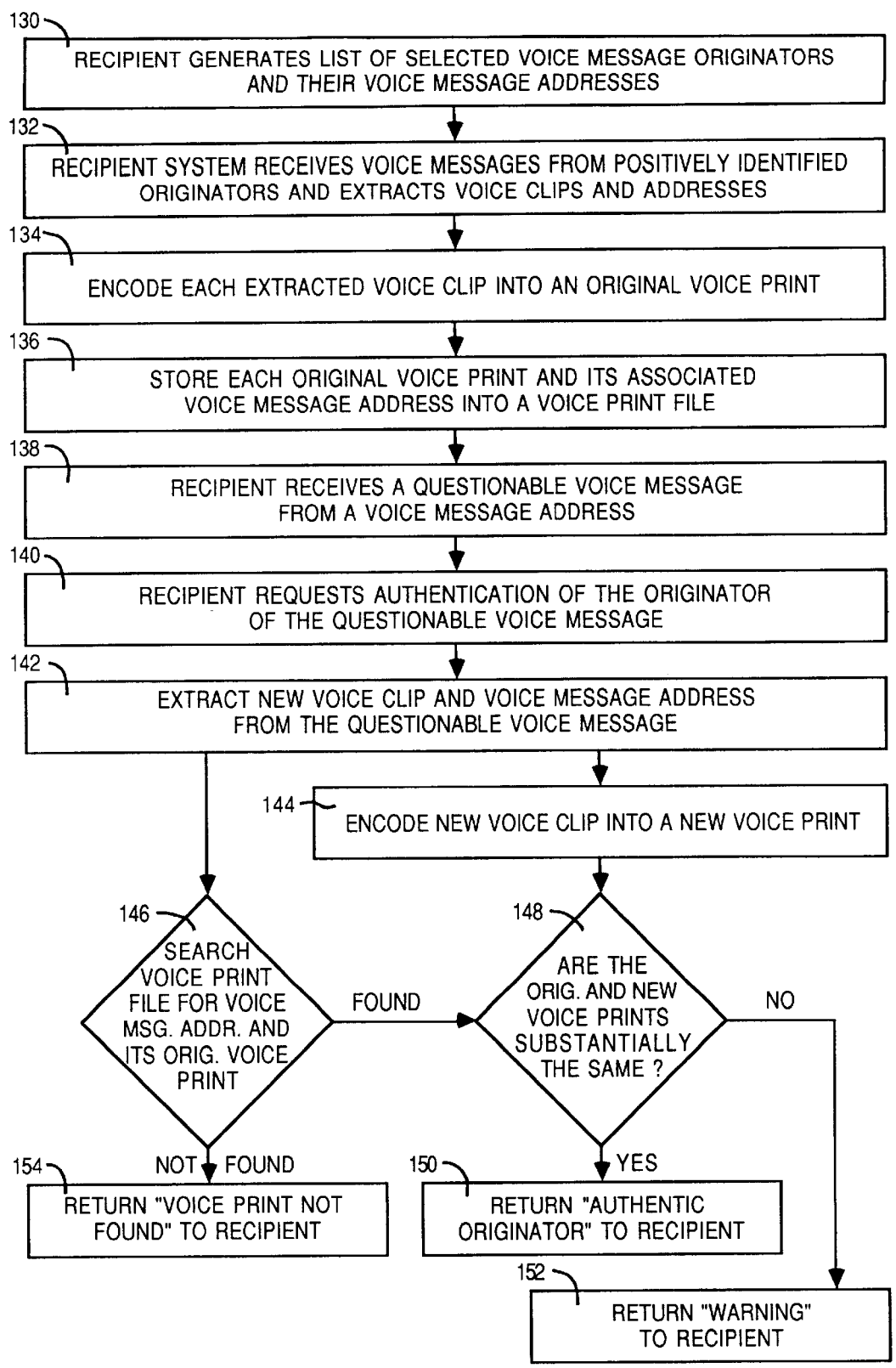
FIG. 6 is a flow diagram showing steps for authenticating a voice message originator by employing voice recognition of voice clips of this invention.

FIG. 6 shows a voice authentication embodiment of this invention by which administration service 28 can respond to voice authentication requests from subscribers and identify the voices of selected voice message originators.

Referring also to FIG. 2, authentication of a voice message originator, for example in voice message system 18, preferably employs a voice recognition unit 120 in communication with administration service 28 to encode voice prints of selectively received voice clips and to store the voice prints and their associated voice message addresses into a "voice print file" located in a voice print file store 122. Of course, voice recognition unit 120 and voice print file store 122 may be directly connected to other telecommunications network resources, such as voice message systems 16 and 18, that require a dedicated voice authentication capability.

The voice print file is generated by voice recognition unit 120 using well known voice printing and voice recognition procedures, such as those provided by the VPRO Speech Recognition System manufactured by Voice Processing Corporation, Cambridge, Mass. Voice clips, or voice signatures if available, are selected for voice printing by subscribers to administration service 28, which receives from VMSFU 22 voice message envelopes having the selected voice message addresses. Voice clips are extracted from the selected voice message envelopes, encoded by voice recognition unit 120, and added to the voice print file along with their associated voice message addresses.

When a questionable voice message is subsequently received by a voice message recipient at voice message system 16 from a voice message originator at voice message system 18, the voice message recipient may transmit to administration service 28 a voice authentication request along with a voice clip of the questionable voice message and the voice message address of the questionable voice message originator. Voice recognition unit 120 encodes the voice clip into a new voice print and compares it with the voice print currently stored and associated with the voice message address. If the two voice prints are substantially the same, a suitable voice authentication response is returned to the voice message recipient. However, if the two voice prints are substantially different, the voice authentication response is a suitable "warning" message indicating that the questionable voice message may have been recorded by an imposter. Of course, if no voice print associated with the voice message address is found, the voice authentication response is a suitable "voice print not found" indication.

If the questionable voice message originator proves to be an imposter, administration service 28 could potentially locate the imposter by searching voice print files located in voice print file stores elsewhere in telecommunications network 10.

Voice clip authentication of a voice message originator proceeds according to the flow diagram of FIG. 6.

A voice message address selecting block 130 represents a voice message recipient generating a list of selected voice message originators and their associated voice message addresses.

An original voice clip extracting block 132 represents receiving voice messages from positively identified originators of the selected voice message addresses and extracting an original voice clip and voice message address from each voice message.

An original voice clip encoding block 134 represents encoding each of the original voice clips into a voice print.

A voice print storing block 136 represents storing the original voice prints and their associated voice message addresses in a voice print file.

A questionable voice message receiving block 138 represents the voice message recipient receiving a questionable voice message from a voice message address.

A voice authentication requesting block 140 represents the recipient of the questionable voice message requesting authentication of the originator of the questionable voice message.

An new voice clip extracting block 142 represents extracting a new voice clip and the voice message address from the questionable voice message.

An new voice clip encoding block 144 represents encoding the new voice clip into a new voice print.

A voice print file searching block 146 represents searching the voice print file for an original voice print associated with the voice message address of the questionable voice message.

If an associated original voice print is found, a voice print comparing block 148 compares the original voice print with the new voice print.

If the compared voice prints are substantially the same, an authenticated response returning block 150 returns a suitable "authentic voice message originator" response to the voice message recipient.

If the compared voice prints are substantially different, a warning response returning block 152 returns a suitable "warning, possible imposter" response to the voice message recipient.

If voice print file searching block 146 does not find an original voice print associated with the voice message address of the questionable voice message, a negative response returning block 154 returns a suitable "voice print not found" response to the voice message recipient.

Skilled workers will understand that many changes may be made to the details of the above-described embodiment of this invention without departing from the underlying principles thereof. For example, the protocols described may be employed to convey, for example, nonvoice audio information and video information.

Accordingly, it will be appreciated that this invention is also applicable to networked communications applications other than those found in voice message store and forward communication systems. The scope of this invention should, therefore, be determined only by the following claims.

What is claimed is:

1. In a telecommunications network, a method of authenticating for a first user of a first voice message system an identity of a second user of a second voice message system, comprising:

receiving at the first voice message system multiple voice messages, at least one of which is an original voice message known to be received from the second user and having a voice message address of the second user;

extracting from the original voice message the voice message address of the second user and a voice clip comprising a predetermined voice segment of the original voice message;

encoding the voice clip into an original voice print;

storing in a voice print file the original voice print in association with the voice message address of the second user;

receiving a questionable voice message addressed to the first user from the voice message address of the second user;

extracting from the questionable voice message address the voice message address of the second user and a new voice clip;

encoding the new voice clip into a new voice print;

searching the voice print file for the voice message address of the second user;

retrieving the original voice print associated with the voice message address of the second user;

comparing the original voice print and the new voice print; and returning to the first user an authenticating response if the original voice print and the new voice print are substantially the same.

2. The method of claim 1 further including returning to the first user a warning response if the original voice print and the new voice print are substantially different.

3. The method of claim 1 further including searching the voice print file for a matching voice print that is substantially the same as the new voice print and returning to the first user a voice message address associated with the matching voice print.

4. The method of claim 1 in which the voice print file is stored in a voice print file store associated with one of the first voice message system, an originating store and forward unit, and an administration service.

5. The method of claim 1 in which the predetermined voice segment is an predetermined number of seconds of a beginning portion of the original voice message.

6. The method of claim 5 in which the predetermined number of seconds is in a range from about 2 seconds to about 3 seconds.

7. The method of claim 1 in which the original message further includes a voice signature field and the extracting step further includes substituting the voice signature field for the voice clip.

* * * * *